(12) United States Patent
Wood et al.

(10) Patent No.: US 12,121,019 B2
(45) Date of Patent: *Oct. 22, 2024

(54) PORTABLE HUNTING BLIND CHAIR OR SEAT WITH SIMPLE, RELIABLE, AND QUICK SETUP AND TAKE-DOWN

(71) Applicant: Icon Outdoors, LLC, Olive Branch, MS (US)

(72) Inventors: Tate Wood, Olive Branch, MS (US); Bobby L. Windham, Jr., Olive Branch, MS (US); James L. Spence, Olive Branch, MS (US)

(73) Assignee: Icon Outdoors, LLC, Olive Branch, MS (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/095,084

(22) Filed: Jan. 10, 2023

(65) Prior Publication Data
US 2023/0157273 A1 May 25, 2023

Related U.S. Application Data

(63) Continuation of application No. 17/736,014, filed on May 3, 2022, now Pat. No. 11,547,110, which is a continuation of application No. 17/112,954, filed on Dec. 4, 2020, now abandoned.

(60) Provisional application No. 62/942,227, filed on Dec. 2, 2019.

(51) Int. Cl.
| | |
|---|---|
| A01M 31/02 | (2006.01) |
| E04H 15/00 | (2006.01) |
| E04H 15/34 | (2006.01) |
| A47C 7/66 | (2006.01) |

(52) U.S. Cl.
CPC ......... *A01M 31/025* (2013.01); *E04H 15/001* (2013.01); *E04H 15/34* (2013.01); *A47C 7/666* (2018.08)

(58) Field of Classification Search
CPC ....... E04H 15/001; A01M 31/025; A47C 7/66
See application file for complete search history.

(56) References Cited

U.S. PATENT DOCUMENTS

| | | | |
|---|---|---|---|
| 1,033,108 | A | 7/1912 | Lehmann |
| 3,075,252 | A | 1/1963 | King |
| 3,509,891 | A | 5/1970 | De Bolt |
| 3,622,201 | A | 11/1971 | Radig |
| 6,296,002 | B1 | 10/2001 | Tashchyan |

(Continued)

*Primary Examiner* — Noah Chandler Hawk
(74) *Attorney, Agent, or Firm* — Warren D. Schickli; Stites & Harbison PLLC

(57) ABSTRACT

Portable hunting blind including seat/chair for use in hunting or similar environment including side panels and hinge brackets having support arms mounted to side panels; seat mounted to side panels, the seat together with side panels and hinge brackets having support arms form a chair-like structure; skirt put around side panels to conceal hunter sitting on seat; and bonnets and blind top. Blind top conceals hunter while allowing hunter to see what is going on around him. To hunt or to come out of portable hunting blind, hunter stands up throwing back bonnets and hitting the skirt with his knee, thereby detaching skirt. Portable hunting blind is folded by folding side panels along with skirt with help of hinge brackets and by throwing back bonnets to retracted state for easy transport.

17 Claims, 16 Drawing Sheets

(56) References Cited

U.S. PATENT DOCUMENTS

| | | | |
|---|---|---|---|
| 6,371,553 | B1 | 4/2002 | Tang |
| 6,769,442 | B2 | 8/2004 | Johnson |
| 7,219,680 | B1 | 5/2007 | Gresock |
| 7,427,101 | B1 | 9/2008 | Zernov |
| 7,753,063 | B1 | 7/2010 | Laws |
| 7,997,291 | B2 | 8/2011 | Gressette, III et al. |
| 8,727,190 | B2 | 5/2014 | Blair |
| 9,072,290 | B1 | 7/2015 | McCauley |
| 9,220,344 | B2 | 12/2015 | Birch |
| 10,472,850 | B2 | 11/2019 | Grace et al. |
| 10,863,734 | B1 | 12/2020 | George |
| 11,116,320 | B2 | 9/2021 | Morales et al. |
| 2004/0255526 | A1* | 12/2004 | Tremblay ................ E04H 15/48 52/79.5 |
| 2006/0220424 | A1 | 10/2006 | Fargason |
| 2021/0161123 | A1 | 6/2021 | Wood et al. |

\* cited by examiner

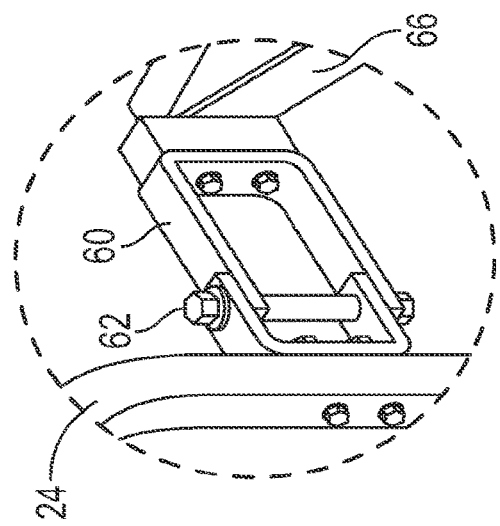
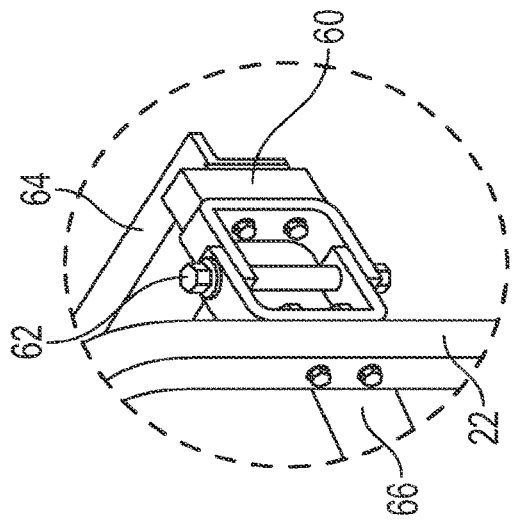
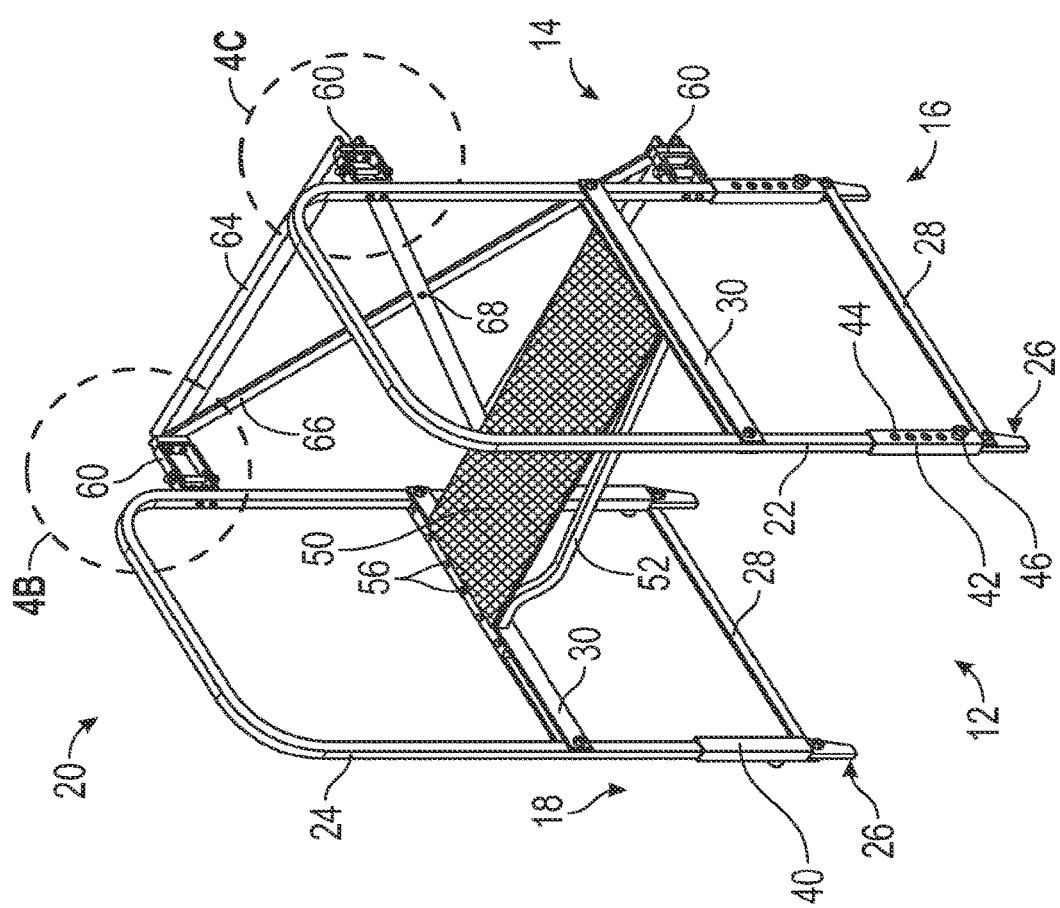

PORTABLE HUNTING BLIND CHAIR OR SEAT WITH SIMPLE, RELIABLE, AND QUICK SETUP AND TAKE-DOWN

The present application is a continuation of U.S. patent application Ser. No. 17/736,014. filed May 3, 2022; which is a continuation of U.S. patent application Ser. No. 17/112,954, filed Dec. 4, 2020; which claims the benefit of U. S. Provisional Patent Application No. 62/942,227, filed Dec. 2, 2019; all of which are incorporated herein by reference.

FIELD OF THE DISCLOSURE

The present disclosure relates to chairs and seats including chairs having concealing canopies and especially adapted to protect a user against weather and, more specifically, to a chair or seat providing a hunting blind, causing the chair or seat to camouflage the user to appear as part of the environment during hunting or photographing wildlife. The chair provides use in hunting waterfowls in shallow water or in field by concealing the user.

BACKGROUND OF THE DISCLOSURE

A hunting blind is a cover device for hunters or gamekeepers, designed to reduce the chance of detection. There are different types of blinds for different situations, such as ground blinds, deer blinds and duck blinds. Some are exceedingly simple, while others are complex. The legality of various kinds of blinds may vary according to season, state and location.

Duck blinds may be stable or mobile. The ground blinds are used as an alternative to the traditional tree stand; movements in a well-designed ground blind can virtually be undetectable by the game. The duck blinds can be as simple as a hunter walking two or three miles out into a grain field, stopping at a dike, a raised area, two feet or so high, 10 or 12 feet wide and usually a half mile or so long on a side. Duck hunter simply sits down on the top and pushes dirt away with feet, front and back.

The duck blinds can also be quite elaborate, and their purpose may often extend beyond concealment to include protection from the elements, particularly from rain and cold. In some areas, the blinds can approach small cabins in their size and amenities. Also, for hunting waterfowl in fields, the hunters may use a layout blind. A layout blind is a low profile blind that a person can lay down in and stubble in to hide from waterfowl. Moreover, some blinds may be portable.

One such example of a blind is disclosed in a U.S. Pat. No. 9,072,290, entitled "Portable Hunting Blind" (the "'290 patent"). The '290 patent discloses a portable hunting blind including a chair and a canopy frame draped with a cover. A spring interconnects the chair and the canopy frame for rotating the canopy frame backwardly so that the cover is no longer above the seat of the chair. A quick spring release triggered by a user with his elbow or arm is provided on an armrest of the chair. In the moment that the canopy is rotated, the user may take a shot from a seated or standing position in the blind.

Another example a blind is disclosed in a U.S. Pat. No. 7,997,291, entitled "Portable hunting chair and blind" (the "'291 patent"). The '291 patent discloses a hunting chair with a hunting blind attachment that encircles the chair, as well as an attachable camouflage roof covering, all of which may be folded and disassembled in such a way that it fits into a self-contained pack that may be carried on a hunter's back. The chair includes an adjustable, pivoting backrest, a pivoting gun rest with telescoping legs for height adjustment, folding legs, a pouch to contain the disassembled elements, and shoulder straps for carrying the apparatus. In its disassembled state, the roof poles, roof fabric, and blind fabric are packed into a pouch on the backside of the backrest, and the chair is folded into a carrying position. Detachable shoulder straps may be attached to the underside of the seat section, so that the entire chair and blind combination may be carried on a hunter's back into the field.

Yet another example of a blind is disclosed in a U.S. Pat. No. 3,622,201, entitled "Portable blind" (the "'201 patent"). The '201 patent discloses a portable blind for providing concealment and shelter in the field for hunters or observers of wild life is constructed of separable and foldable parts, both to permit quick and convenient assembly under field conditions and to facilitate transportation and storage. The blind includes a user seat, and the seat and cover portions of the blind are adapted for rotation as a unit upon the support structure therefor, to permit quiet and unobtrusive scanning of the surrounding terrain in any direction without the user emerging from the blind, substantially altering his position within the blind, or otherwise creating any undue movement or disturbance that may tend to frighten wild game. The cover portion of the blind, which may be camouflaged, is adapted for immediately and automatically opening from its normal or almost closed condition to an opened condition providing a wide angle field for vision or shooting, whenever a suitable holding means associated with the elements that support the cover shroud is released by the user.

Yet another example of a blind is disclosed in U.S. Pat. No. 6,769,442, entitled "Hunting blind with flip-up hood" (the "442 patent"). The '442 patent discloses an apparatus, useful as a hunting blind, includes a base, a seat operably mounted on the base, and a spring-biased camouflaged hood movably supported over the seat. A latch holds the hood down until a hunter sits on the seat, releasing the latch, but the hunter's weight then holds the hood down against the spring. The spring automatically moves the hood from a closed hiding position toward an open position when a hunter stands up, as the hunter removes his weight from the seat. The base is adapted with radially extending feet for stability.

Each of the above-referenced blinds has limitations. For example, the prior art portable hunting blind, like a typical folding chair, has legs in "X" configuration beneath the seat. All of the weight flows through the legs pivot points where the legs scissor or "X" configuration. This causes all of the user's weight to be experienced in only two spots on the folding frame.

Furthermore, due to the complex structure, the prior art hunting blinds for which disassembly to leave the hunting scene takes much longer and is significantly more complicated. Further, existing tops, where most tops that pivot on both sides of the blind have to be separated or removed in some way from the sides or front half of the blind taking up valuable time.

In addition, when the prior art blind is used with a camouflage brush, the brush generally does not fold evenly. As such, when there is a need to fold the blind and the camouflage brush, users of such blinds must fold the blind top, which may damage the brush or require removal of some of the installed brush. Further, if the prior art hunting blind is brushed with willow limbs that do not bend easily, folding the blind top for transport generally does not work well.

Therefore, there is a need for improvement in the structure and functions, use and manufacture of the blind for hunting and other purposes. The present disclosure makes possible a number of the needed solutions and makes a material and substantial improvement to the current state of the art in portable hunting blinds for related purposes.

BRIEF SUMMARY OF THE DISCLOSURE

The present disclosure includes a portable hunting blind or portable shallow water chair blind including a chair-like structure for camouflaging a user or hunter to appear as part of the environment during hunting or photographing wildlife.

In order to overcome one or more of the limitations here stated objects, the present invention provides a portable hunting blind including a skeletal frame structure including two side panels and a back. Further, the skeletal frame structure includes a seat mounted to the two side panels of the skeletal frame structure. Further, the skeletal frame structure includes two braces beneath the seat for evenly distributing the weight from each corner back to the other side when a user or hunter sits on it. The seat and the braces are hingedly mounted to the skeletal frame structure for ease of folding the skeletal frame structure.

The portable hunting blind includes hinge brackets mounted to the side panels of the skeletal frame structure. The hinge brackets are connected using support arms which form the back of the skeletal frame structure. The hinge brackets are designed in such a way that the hinge brackets on the left side panels are longer, or deeper, than the hinge brackets on the right or opposite side panels. By extending the size of left side hinge brackets, the left and right side panels fold flat. The longer hinge brackets on the opposite side provide sufficient room for folding flat on top of the right or other side that folded in first.

The portable hunting blind includes a skirt or cover or blind that is put around the skeletal frame structure to envelope the skeletal frame structure and the hinge brackets. The skirt includes a bungee cord for slipping brushes across the skirt thereby blending the portable hunting blind with the environment.

In addition, the portable hunting blind includes bonnets at the top of the skeletal frame structure. The bonnets include a blind top i.e., a cover. The bonnets retract or expand and provides access to an interior of the portable hunting blind. The blind top is a sheet-like structure made up of spring steel sewn into channels and holds its shape when unfolded fully. The channels allow the hunter to see through while being seated on the seat. As such, once the hunter is inside, the portable hunting blind comfortably conceals the hunter while allowing the hunter to see what is going on around him. Further, the blind top twists and bends easily enough for transport, allowing the hunter to leave the blind top on the portable hunting blind without detachment.

In one technical feature of the present invention, the front side of the skirt or wall mounts to the skeletal frame structure using snaps and/or magnet. When the hunter wishes to exit the portable hunting blind or tries to shoot when stepping out from the portable hunting blind, the hunter can quickly lift the bonnets at the top and throw back. Further, as the hunter stands up to exit or to shoot, his knees hits the skirt and pushes the magnet away from its latch to allow the skirt to easily fall aside without interfering movement of the hunter.

One advantageous feature of the presently disclosed portable hunting blind arises when the user retracts the blind for transport. With prior art hunting blinds, there is the need to fold the blind and fold the camouflage brush, as specified above. In contrast, with the presently disclosed portable hunting blind, because the side panels and the back of the blind act as the wall for brushing, brush limbs stay in place for transport. This provides a significant use advantage over known portable hunting blinds.

When not in use, the hunter folds the blind i.e., the skeletal frame structure along with the skirt holding the brushes, with the blind top that throws back and to a retracted state easily and smoothly. Operating similarly to a walker, the two sides fold in towards one another for storing and take less space than known portable hunting blinds. Further, when the user folds the side panels, including the brush on the outer wall, the brush stays in place, for transport. There is no need to remove the brush or remove the wind blocker panels of the present disclosure. The brush simply stays where it is, secured by the bungee cord and ready for immediate use. This design makes this a super-fast set-up and take down. Once the hunter folds the two sides into the backside, he is ready to transport the portable hunting blind to a new location.

According to one aspect of the presently disclosed subject matter, there is provided an improved portable hunting blind as herein described.

In view of the above, it is an object of the present invention to provide a portable hunting blind, which can be used for both field and waterfowl hunting.

It is another object to provide a hunting blind that allows a hunter to take a shot from a seated or standing position.

It is also an object to provide a hunting blind that comfortably conceals a hunter while allowing the hunter to see what is going on around him.

Other objects, technical aspects and advantages of the presently disclosed portable hunting blind or seat with simple, reliable, and quick setup and take-down hunting and other outdoor sporting activities will become apparent upon reading the technical description appearing below.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIGS. 4A through 4C depict aspects of construction of a hinge bracket for the portable hunting blind;

DETAILED DESCRIPTION OF ILLUSTRATIVE EMBODIMENTS

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description portable hunting blind including a seat or chair with simple, reliable, and quick setup and takedown, it should be understood that the description is by way of example only and is not to be construed in a limiting sense. It is to be further understood that numerous changes may arise in the details of the embodiments of this portable hunting blind including a seat or seat with simple, reliable, and quick setup and takedown. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
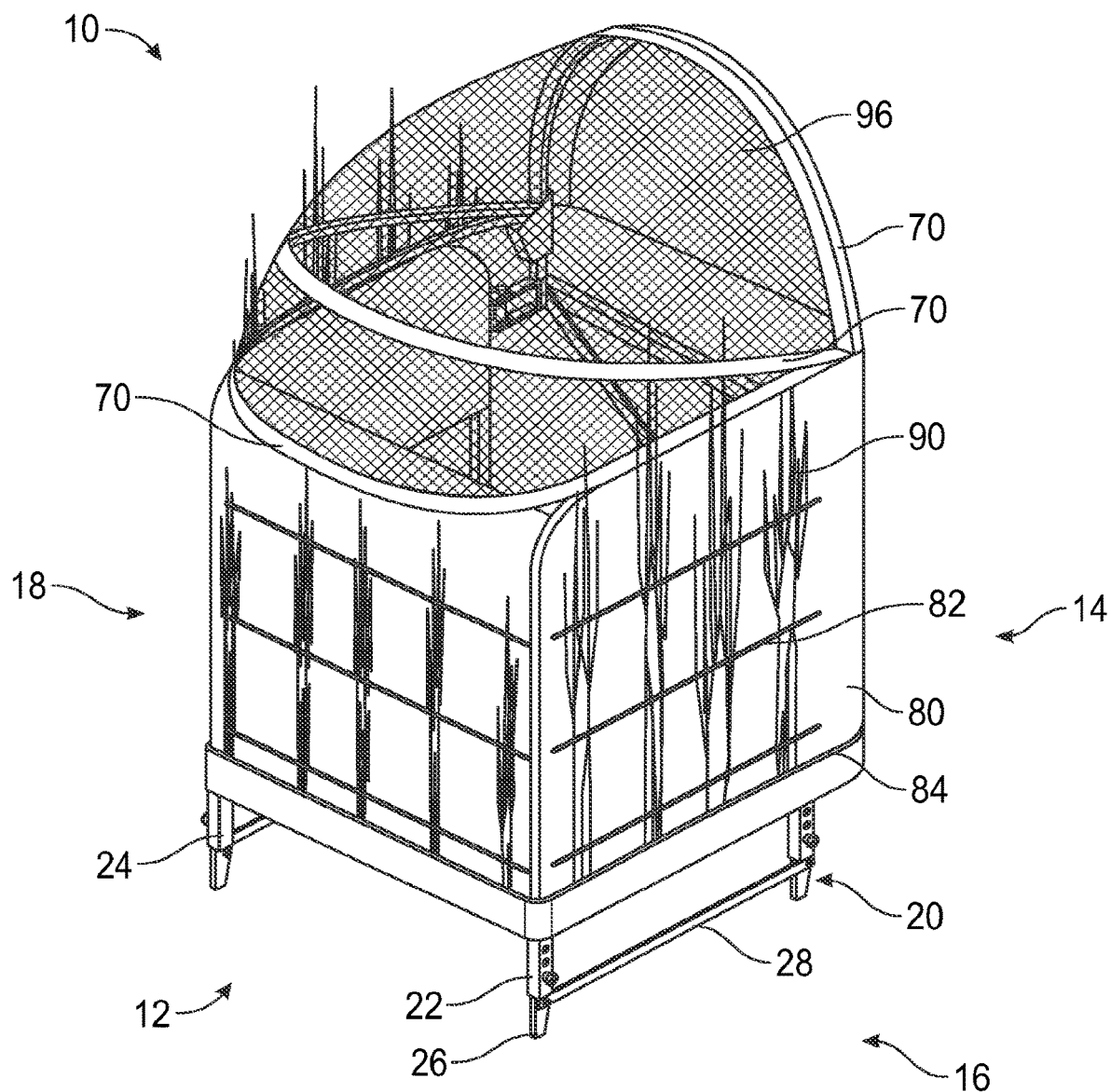
FIG. 1 illustrates an elevated perspective view of a portable hunting blind, in accordance with one embodiment of the present disclosure.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a perspective view of a portable hunting blind or portable shallow water chair blind 10, in accordance with one embodiment of the present invention. Portable hunting blind 10 includes a skeletal frame structure 20, bonnets 70 mounted to skeletal frame structure 20, and a cover or skirt or blind 80 secured around skeletal frame structure 20. Portable hunting blind 10 includes front side 12, rear side 14, right side 16 and left side 18. It should be understood that front side 12, rear side 14, right side 16 and left side 18 herein are used for illustrating sides of skeletal frame structure 20 and should not be construed in a limited sense.

Figure 2B:
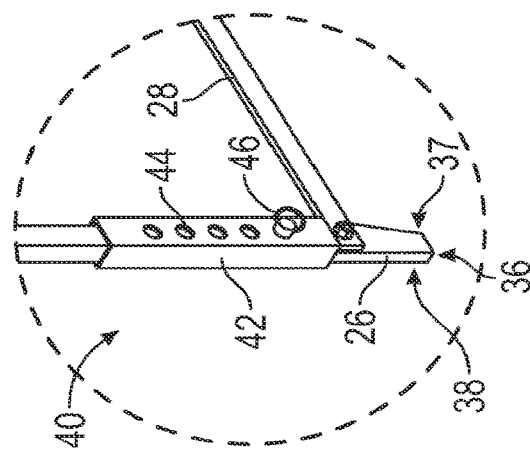
FIGS. 2A through 2C illustrate various aspects of a skeletal frame structure and a seat configuration of the portable hunting blind.
Figure 2C:
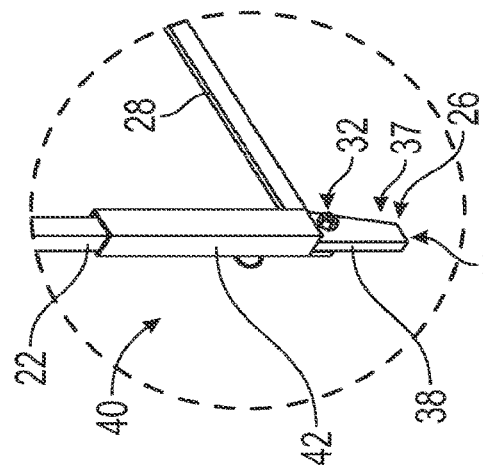
Figure 2A:
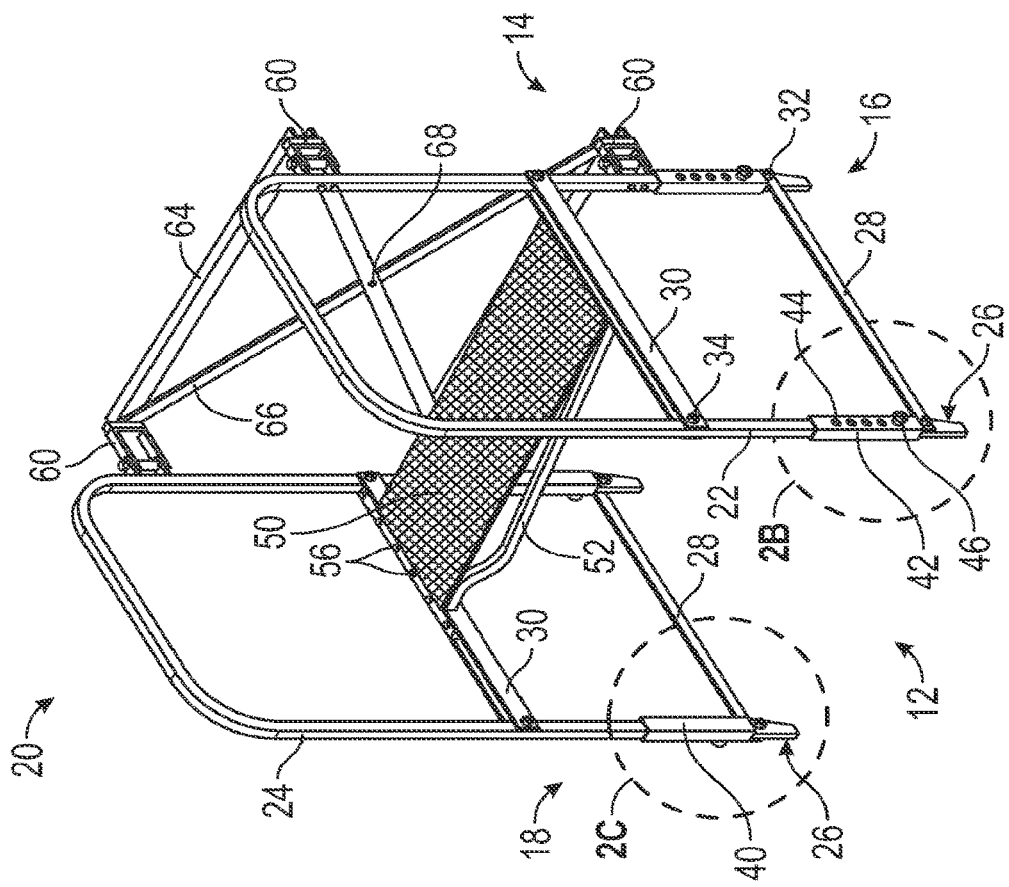

FIG. 2A shows a perspective view of skeletal frame structure 20, in accordance with one embodiment of the present disclosure. Skeletal frame structure 20 includes side panels i.e., first side panel 22 and second side panel 24. First side panel 22 indicates a panel at right side 16 i.e., right side panel of portable hunting blind 10. Second side panel 24 indicates a panel at left side 18 i.e., left side panel of portable hunting blind 10. Each of first side panel 22 and second side panel 24 is provided in a U-shape configuration. Further, each of first side panel 22 and second side panel 24 includes a leg portion 26 indicating an end portion of first side panel 22 and second side panel 24 that comes in contact with the ground. Further, each of first side panel 22 and second side panel 24 includes a first support rod 28 and a second support rod 30. First support rod 28 mounts to leg portion 26 of first side panel 22 and second side panel 24 closer to the ground. First support rod 28 mounts to first side panel 22 using first connector 32. First connector 32 indicates a fastener. Second support rod 30 mounts to second support rod 30. Second support rod 30 mounts to first side panel 22 using a second connector 34. Second connector 34 indicates a fastener.

FIGS. 2B and 2C show leg portion 26 having an angled aluminum strip 36. Angled aluminum strip 36 is two-sided, in that one side 37 is horizontal to the ground and other side 38 is perpendicular to the ground. Perpendicular side 38 acts as a spade with the ground helping reduce lift and left to right shifting in the mud. Horizontal side 37 acts as a first brace/pad to stop sink in the mud from the weight of a hunter when the hunter sits on a seat.

Further, each of first side panel 22 and second side panel 24 includes a leg height adjustment mechanism 40 at leg portion 26, as shown in FIG. 2B. Leg height adjustment mechanism 40 includes a housing 42 indicating a frame put around first side panel 22 or second side panel 24. Each of housing 42 includes holes 44. Further, each of first side panel 22 and second side panel 24 includes panel holes (not shown) for inserting lock pin 46 into holes 44 to lock and adjust the height of the each first side panel 22 and second side panel 24, respectively.

As can be seen from FIG. 2A, skeletal frame structure 20 further includes a seat 50 mounted to second support rod 30 of first side panel 22 and second side panel 24, in that seat 50 mounts horizontally to the ground. Seat 50 provides a material made of metal sheet, or fabric or any other suitable material. Further, skeletal frame structure 20 includes two braces 52 (second brace) provided beneath seat 50. Braces 52 beneath seat 50 evenly distribute the weight from each corner back to the other side. As such, braces 52 provide a suspension seat such that the user or hunter does not feel a frame beneath his body. When the hunter sits on seat 50, braces 52 beneath seat 50 enable the hunter to bounce on a fabric air seat.

Figure 3A:
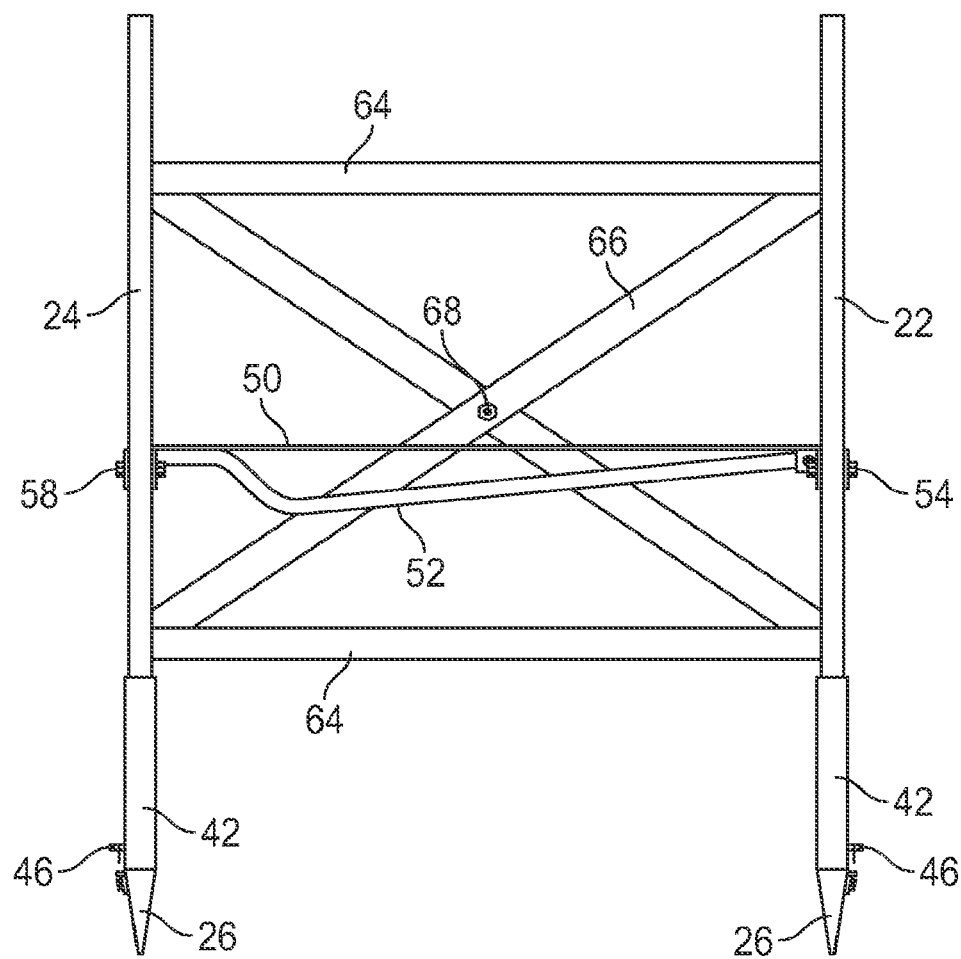
FIGS. 3A through 3C depict aspects relating to the seat of the portable hunting blind.
Figure 3C:
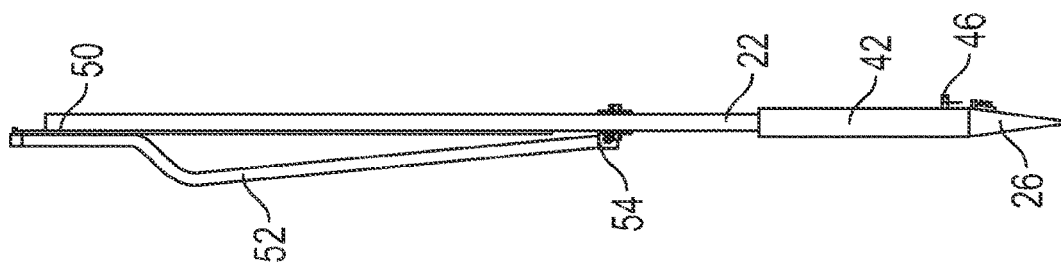
Figure 3B:
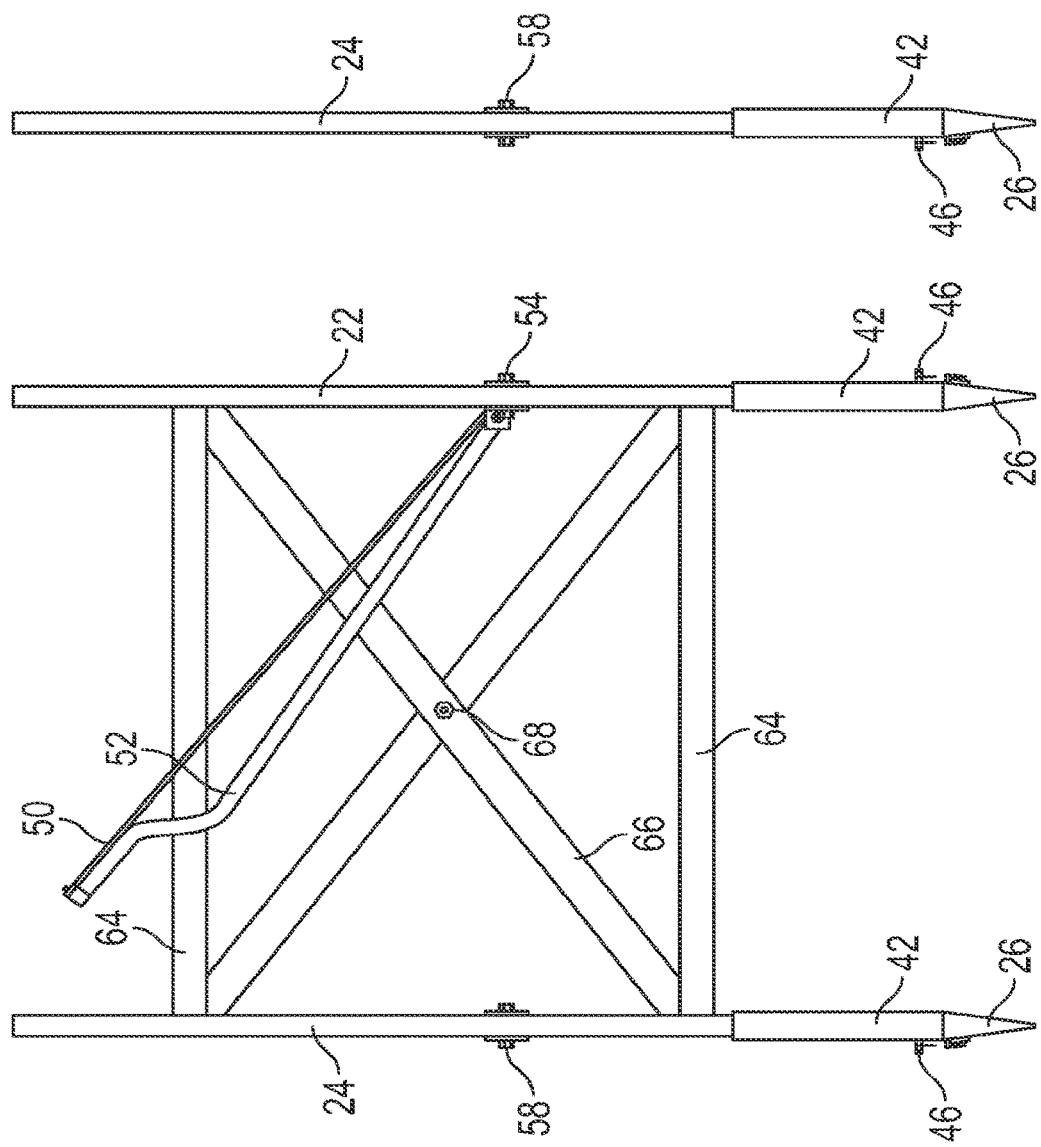

Now referring to FIGS. 3A, 3B and 3C, constructional and operational features of seat 50 are explained. FIG. 3A shows seat 50 fully lowered and engaged with left side i.e., second side panel 24 of portable hunting blind 10. As can be seen, seat 50 hingedly mounts to second support rod 30 at first side panel 22 using a seat connector 54. Further, seat 50 includes pin structures 56 at opposite end i.e., at the end of second side panel 24, as can be seen from FIG. 2A. Pin structures 56 help to mount seat 50 to left side panel i.e., second side panel 24. Second support rod 30 encompasses pin receptacles 58, as shown in FIG. 3A. It should be understood that pin structures 56 engage pin receptacles 58 to secure seat 50 to left side panel 24. Seat 50, right side panel 22 and left side panel 24 form a "H" shaped rigid structure for providing more than sufficient strength to support the hunter's body weight.

FIG. 3B shows seat 50 detached from left side panel 24 and highlights pin structures 56 on seat 50 which are designed to engage left side panel 24 when seat 50 is lowered. FIG. 3C shows seat 50 fully raised to a position parallel and hinged to right side panel 22 with the help of seat connector 54. With seat 50 in raised position, right side panel 22 folds into the back. Subsequently, left side panel 24 folds over retracted right side panel 22 for forming a single, flat structure ready for easy transport. It should be understood that the right and left side structures may be changed to opposite positions, without affecting the scope of the present disclosure.

Referring to FIGS. 2 and 4A, skeletal frame structure 20 including hinge brackets 60 is shown, in accordance with one embodiment of the present disclosure. Hinge brackets 60 are provided at the top section and at substantial mid bottom section of the each first side panel 22 and second side panel 24. It should be understood that hinge brackets 60 mount to first side panel 22 and second side panel 24 with the help of a pin 62. Further, hinge brackets 60 at the top are connected by connecting rod 64. Similarly, hinge brackets 60 at the substantially mid bottom section are connected by another connecting rod 64.

In the current embodiment, hinge brackets 60 on left side panel 24 are longer, or deeper, than hinge brackets 60 on right side panel 22, or vice versa. By extending the size of hinge brackets 60 at left side panel 24, left and right side panels 24, 22 fold flat. The longer hinge on the opposite side provides sufficient room for folding flat on top of the right or other side that folded in first.

Further, skeletal frame structure 20 includes support arms 66 provided in an "X" or scissor configuration. As can be seen, support arms 66 connect via a pivot pin 68. Support arms 66 mount to hinge brackets 60, in that lower left panel hinge bracket 60 connects to top right hinge bracket 60, and lower left hinge bracket 60 connects to top left hinge bracket 60 with the help of support arms 66, as shown in FIG. 4A. Further, FIGS. 4B and 4C show top left hinge bracket 60 and top right hinge bracket 60, respectively illustrating support arms 66 and connecting rod 64 mounted to top hinge brackets 60.

Figure 5A:
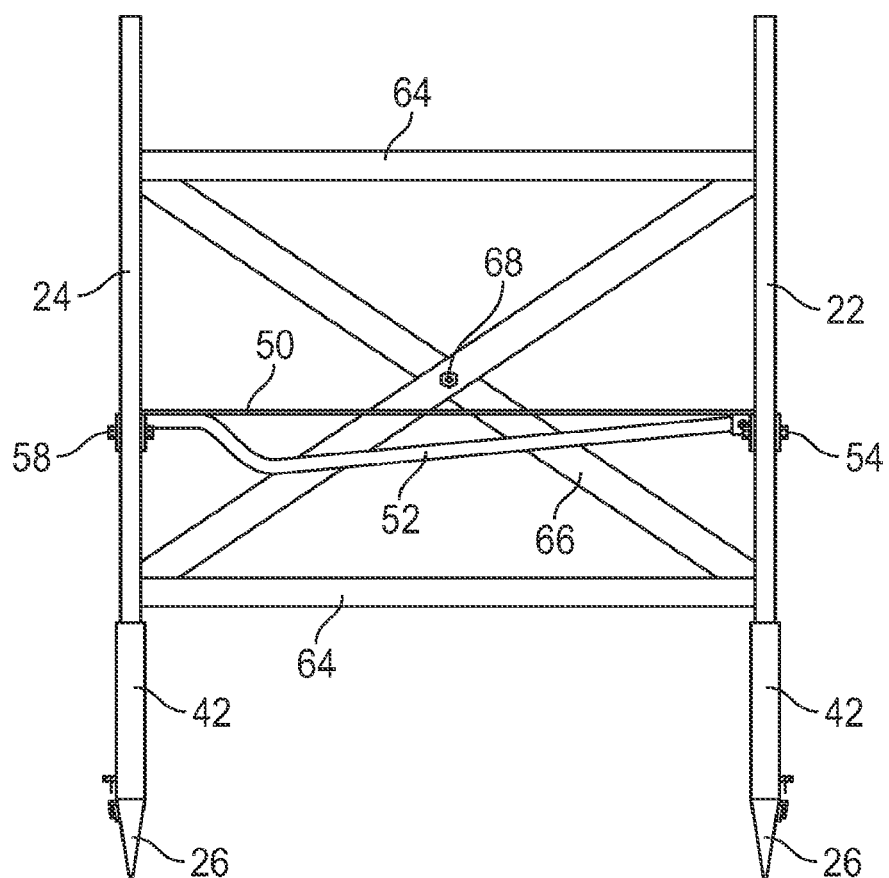
FIGS. 5A through 5C provide a side, and top views, respectively of the skeletal frame structure for the portable hunting blind including fully extended, and engage the seat configurations (FIGS. 5A and 5B) and folded configuration (FIG. 5C)
Figure 5B:
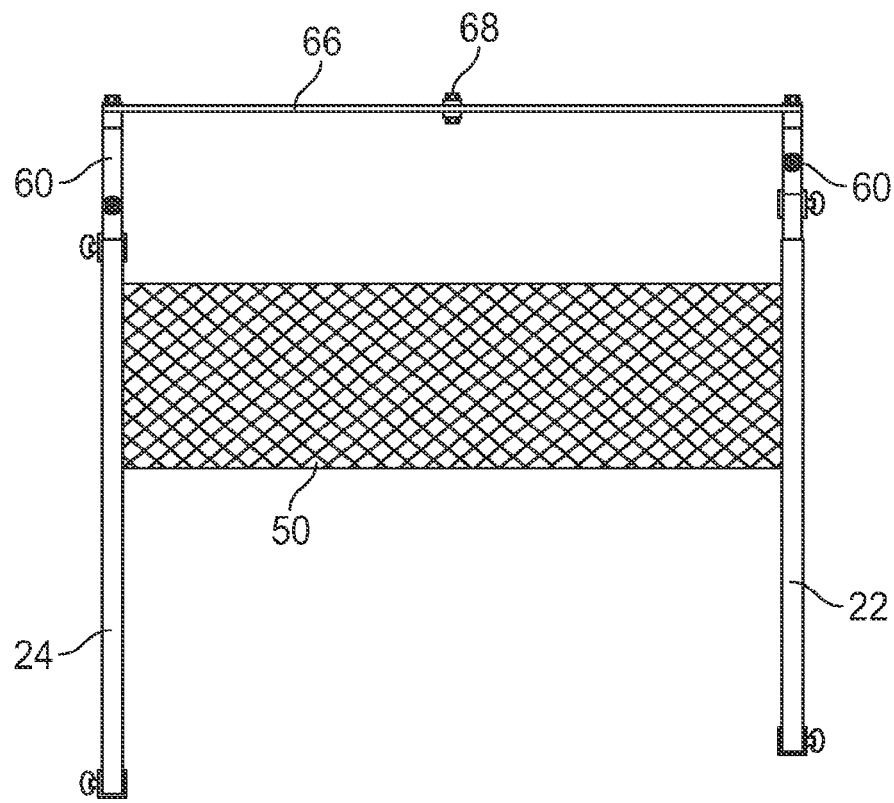
Figure 5C:
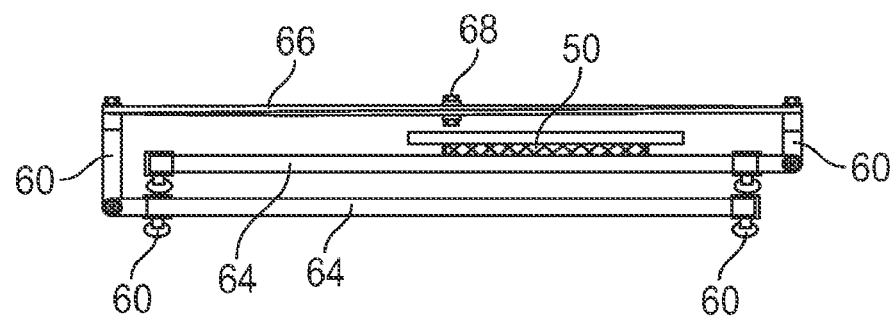
Figure 6A:
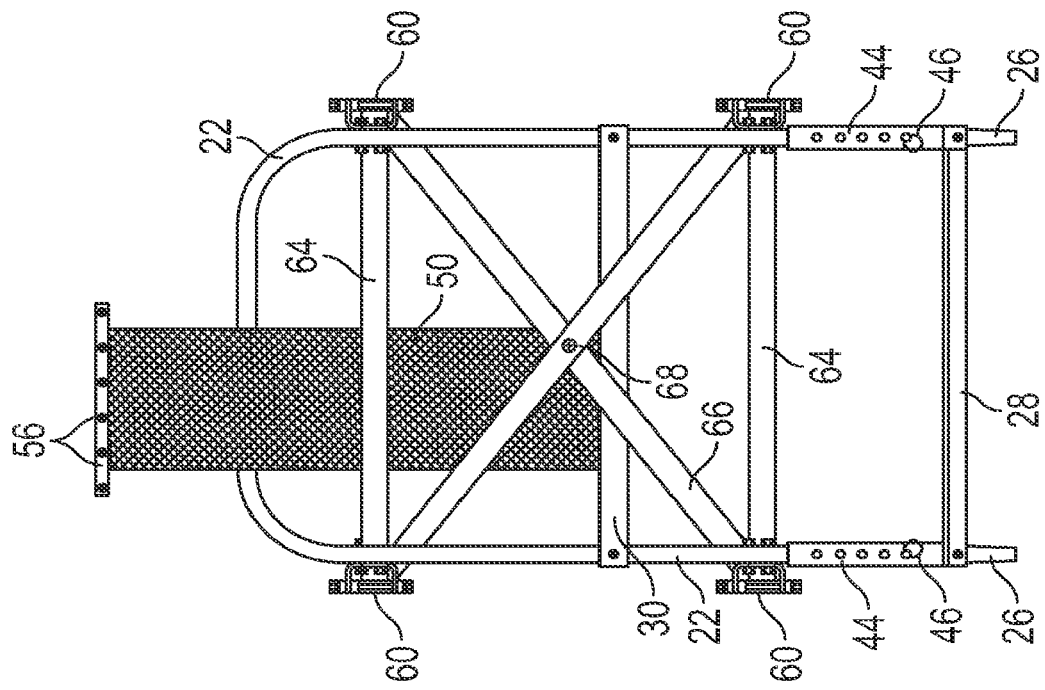
FIGS. 6A and 6B illustrate side perspective views of the fully folded or retracted portable hunting blind.
Figure 6B:
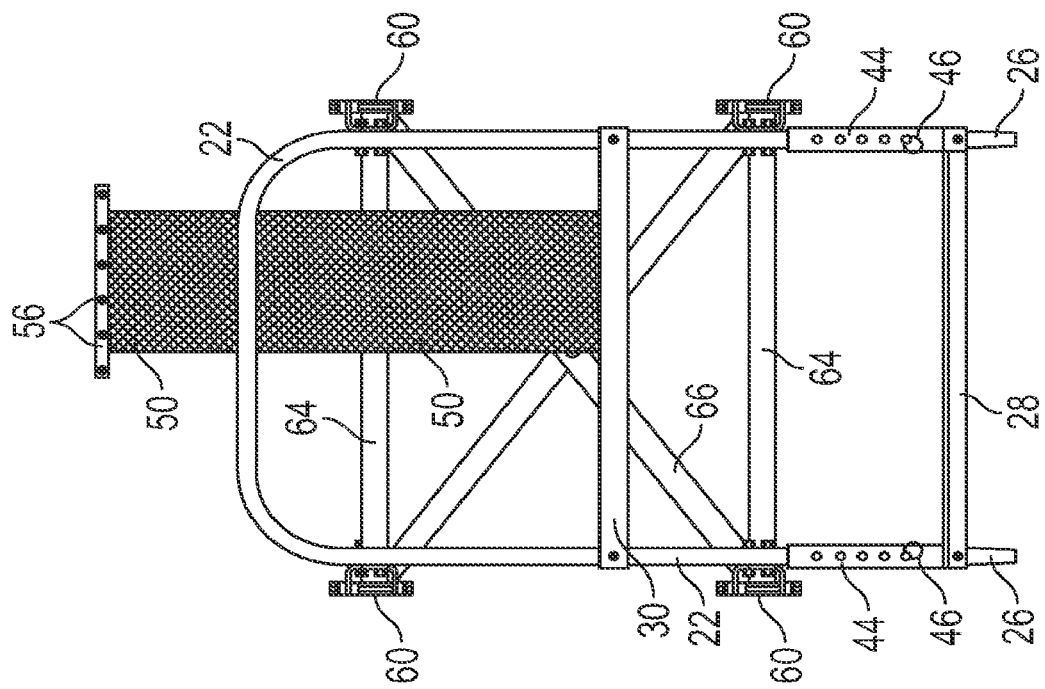

Now referring to FIGS. 5A, 5B and 5C, skeletal frame structure 20 in fully extended and folded configuration are shown. Specifically, FIGS. 5A and 5B show a side and a top view, respectively of skeletal frame structure 20 in fully extended and seat 50 being engaged configuration. Further, FIG. 5C shows a top view of skeletal frame structure 20 in folded configuration. In addition, FIGS. 6A and 6B show side views of the fully folded or retracted configuration of skeletal frame structure 20.

Figure 7A:
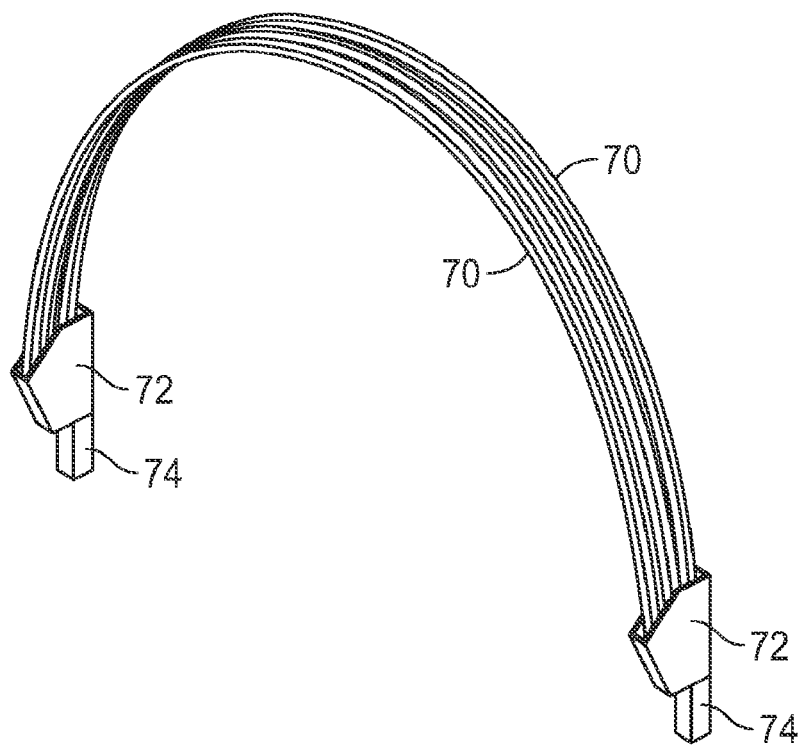
FIGS. 7A and 7B depict aspects of camouflage bonnets in a retracted state (FIG. 7A) and expanded configuration (FIG. 7B)
Figure 7B:
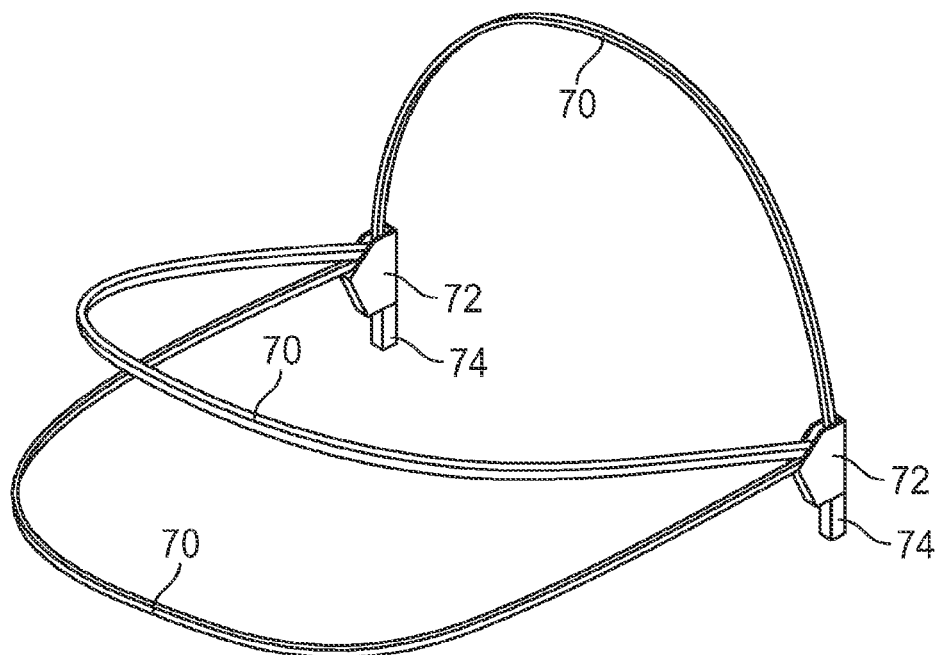
Figure 10:
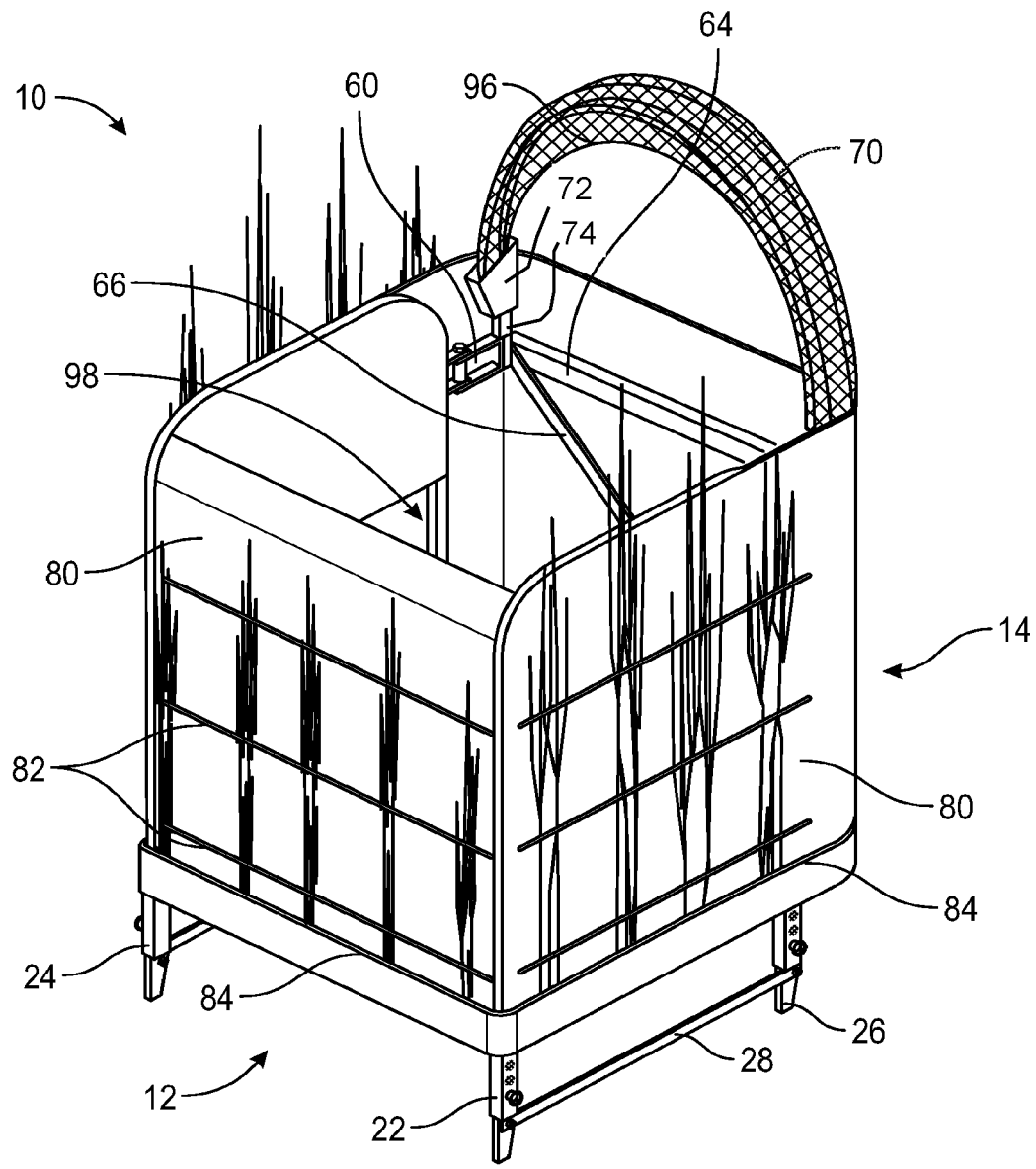
FIG. 10 illustrates one embodiment of the portable hunting blind wherein the camouflage bonnet has been lifted making accessible an interior portion of the portable hunting blind.

In one implementation, portable hunting blind 10 includes bonnets 70. FIGS. 7A and 7B show bonnets 70. Bonnets 70 come in a camouflage configuration and blend with the environment. As can be seen, more than one bonnet 70 may be provided depending upon size of portable hunting blind 10. Bonnets 70 come in a dome-like structure or semi-circular shape such that when bonnets 70 mount to skeletal frame structure 20, they provide sufficient headroom to the hunter sitting on seat 70. Bonnets 70 include a bonnet attachment 72 for holding together the ends of bonnets 70. It should be understood that bonnets 70 retract and expand when held by bonnet attachment 72 as shown in FIGS. 7A and 7B, respectively. In one example, bonnet attachment 72 includes a pivot point 74. Pivot point 74 helps to connect bonnet attachment 72 with hinge brackets 60 or side panels 22, 24. In other words, bonnets 70 mount to skeletal frame structure 20 either at first and second side panel 22, 24 or at hinge brackets 60 provided at first and second side panel 22, 24. In one example, skeletal frame structure 20 i.e., hinge brackets 60 at the top of skeletal frame structure 20 include a receptacle (not shown) for receiving pivot point 74 of bonnets 70. As such, bonnets 70 are easily removable. FIG. 10 shows an aspect of the presently disclosed portable hunting blind 10 in which hinge brackets 60 including the receptacle for receiving pivot pin 74. Bonnets 70 mount at the top of skeletal frame structure 20. It should be understood that bonnets 70 come in a dome-like structure at top portion of skeletal frame structure 20 such that the hunter has sufficient headroom while being seated on seat 50.

Figure 8A:
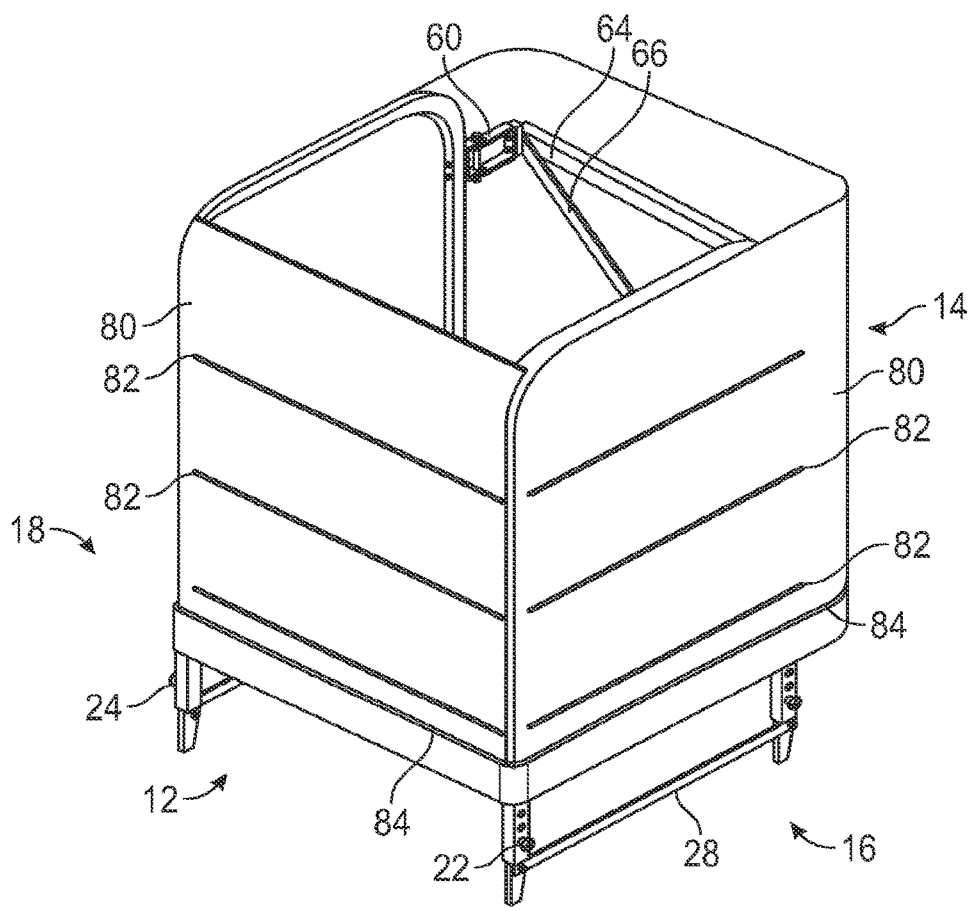
FIGS. 8A through 8C depict various aspects of the front cover or skirt of the portable hunting blind.
Figure 8B:
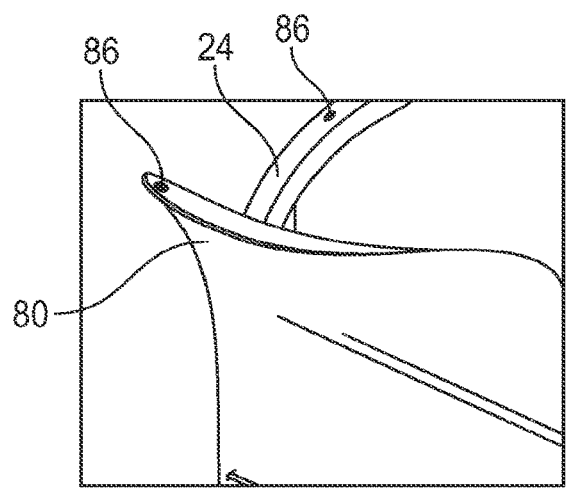
Figure 8C:
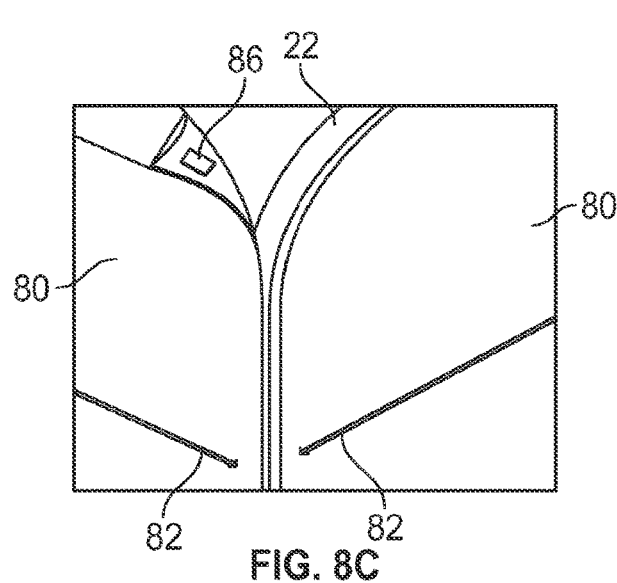

Further, portable hunting blind 10 includes a skirt or cover or blind 80 put around skeletal frame structure 20 to envelope sides of skeletal frame structure 20, as shown in FIG. 8A. It should be understood that skirt 80 is put around skeletal frame structure 20 to fully conceal the hunter while being seated on seat 50. In one example, front side 12 of skirt 80 i.e., facing seat 50 includes a connecting means such as snap 86 for attaching skirt 80 at left side panel 24 of skeletal frame structure 20, as shown in FIG. 8B. Further, front side 12 of skirt 80 i.e., facing seat 50 includes another connecting means such as magnet 88 for attaching skirt 80 at right side panel 22 of skeletal frame structure 20, as shown in FIG. 8C. Although it is shown that snaps or magnets are used for mounting skirt 80 to skeletal frame structure 20, a person skilled in the art will appreciate that other connecting means such as a Velcro, hook and loop mechanism may be used for mounting skirt 80 to skeletal frame structure 20. It is preferable to provide the snaps or magnets at front side 12 of skirt 80 such that when the hunter stands up, his knees hit skirt 80 and push magnet 88 away from its latch to allow skirt 80 to easily fall aside without interfering as the hunter exits portable hunting blind 10 or tries to shoot when stepping out from portable hunting blind 10.

Figure 9B:
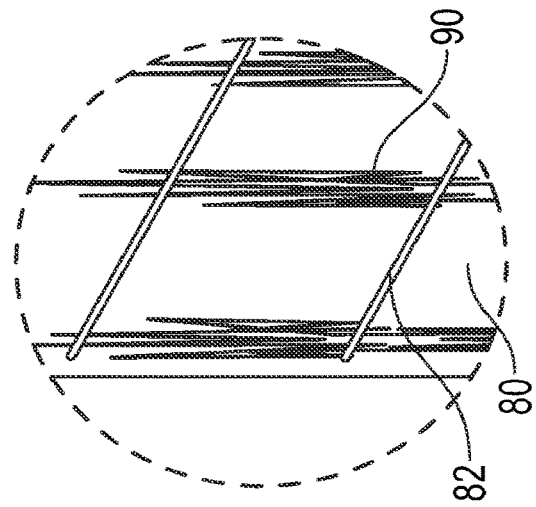
FIGS. 9A through 9C illustrate various aspects of the portable hunting blind in which brushes are secured to the skirt.
Figure 9C:
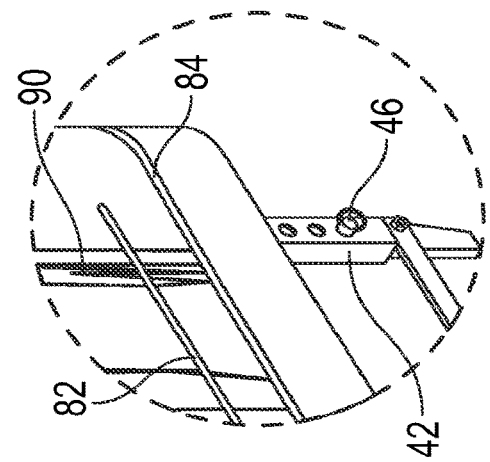
Figure 9A:
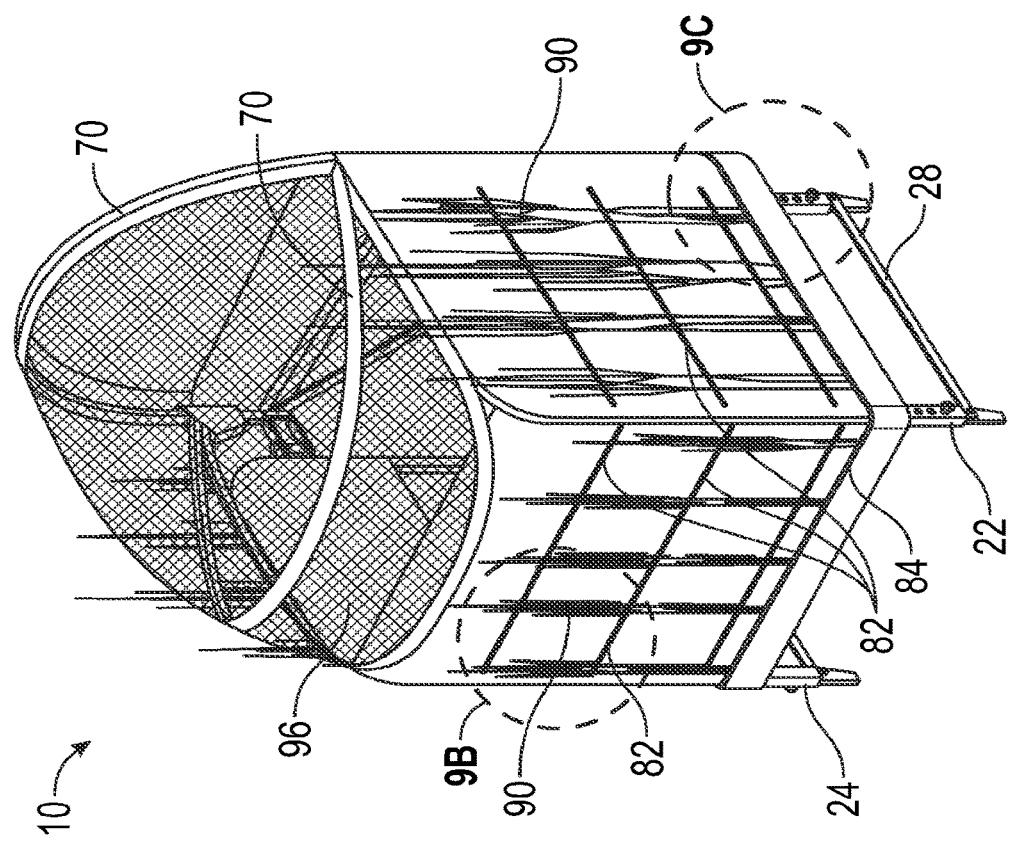

At the outer portion, skirt 80 presents a bungee cord 82, as seen in FIG. 9A. In one example, bungee cord 82 may be sewn into skirt 80 or attached to skirt 80 using known mechanisms. Bungee cord 82 mounts at one or two or all sides of skirt 80. Further, skirt 80 includes a brush pouch 84 at the bottom portion of skirt 80. Brush pouch 84 helps to secure brushes 90 and helps to prevent them from falling through. It is known that blinds are generally provided with brushes along the perimeter wall of the blind. Similarly, brushes 90 are provided along the wall of skirt 80. As specified above, brush pouch 84 helps to secure or rest brushes or corn stalk or limbs 90. As such, brush pouch 84 ensures that brushes 90 are properly secured to skirt 80, as shown in FIG. 9B. In one example, the hunter pulls and slips brushes 90 into bungee cord 82 for holding brushes 90 tight and prevents shifting of portable hunting blind 10 when portable hunting blind 10 is in use. FIG. 9C shows brushes 90 slipped into bungee cord 82. In one example, the hunter pulls and slips camouflage brushes 90 in the form of a limb, corn stalk or sagebrush into bungee cords 82 for holding brushes 90 tight. This helps to prevent brushes 90 shifting when portable hunting blind 10 is in use. Optionally, the hunter ties grass to bungee cord 82 of skirt 80 to make portable hunting blind 10 to appear as part of the environment.

Figure 11:
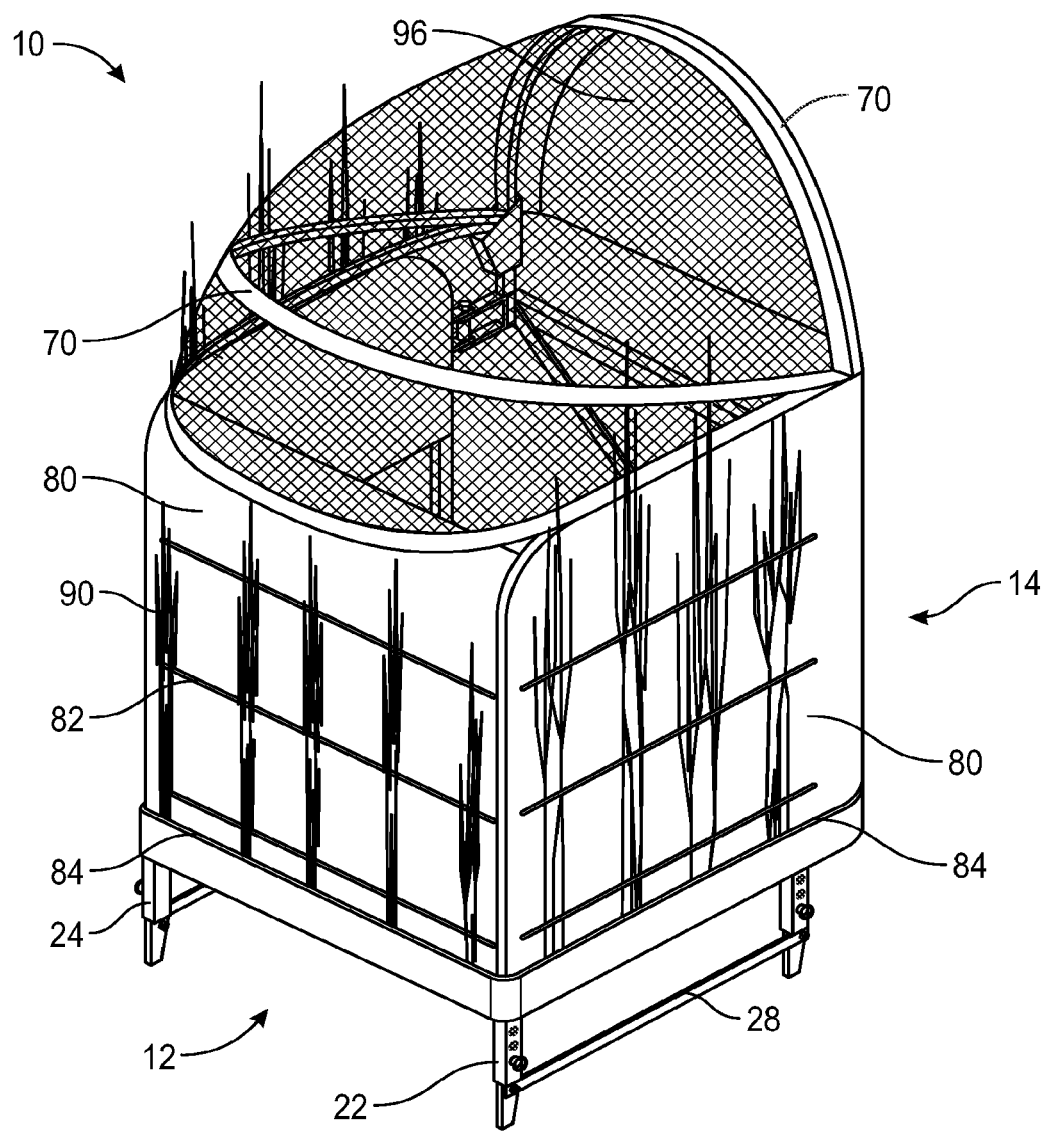
FIG. 11 illustrates further embodiment of FIG. 10 showing the camouflage bonnet closed at the top of portable hunting blind.

Further, portable hunting blind 10 includes a blind top 96, as can be seen in FIGS. 9A, 10 and 11. Blind top 96 indicates a sheet made up of spring steel sewn into channels in a camouflage configuration. The channels are sewn to a porthole mesh fabric. Blind top 96 provides a material made up of spring steel and holds its shape when unfolded fully. In the current embodiment, blind top 96 mounts to bonnets 70. As specified above, blind top 96 holds its shape when unfolded fully. As such, when bonnet 70 expands, blind top 96 unfolds and gives ample headroom beneath blind top 96. Blind top 96 provides a technical advantage of easy bending for ease of blind top use. Further, blind top 96 twists and bends easily enough for transport, allowing the hunter to leave blind top 96 on portable hunting blind 10 without detachment. In other words, top i.e., blind top 96 of presently disclosed portable hunting blind 10 does not need to be removed when the hunter is ready to go and depart the hunting scene. This is in contrast to existing tops, where most tops that pivot on both sides of the blind have to be separated or removed in some way from the sides or front half of the blind taking up valuable time.

Referring to FIG. 10, portable hunting blind 10 provides an interior 98 up on lifting bonnets 70. As specified above, bonnets 70 retracts and expands. Further, blind top 90 twists and bends easily. As such, when bonnets 70 are lifted/retracted, it provides access to interior 98 of portable hunting blind 10. Further, when bonnets 70 are expanded, blind top 96 unfolds as shown in FIG. 11.

Figure 12:
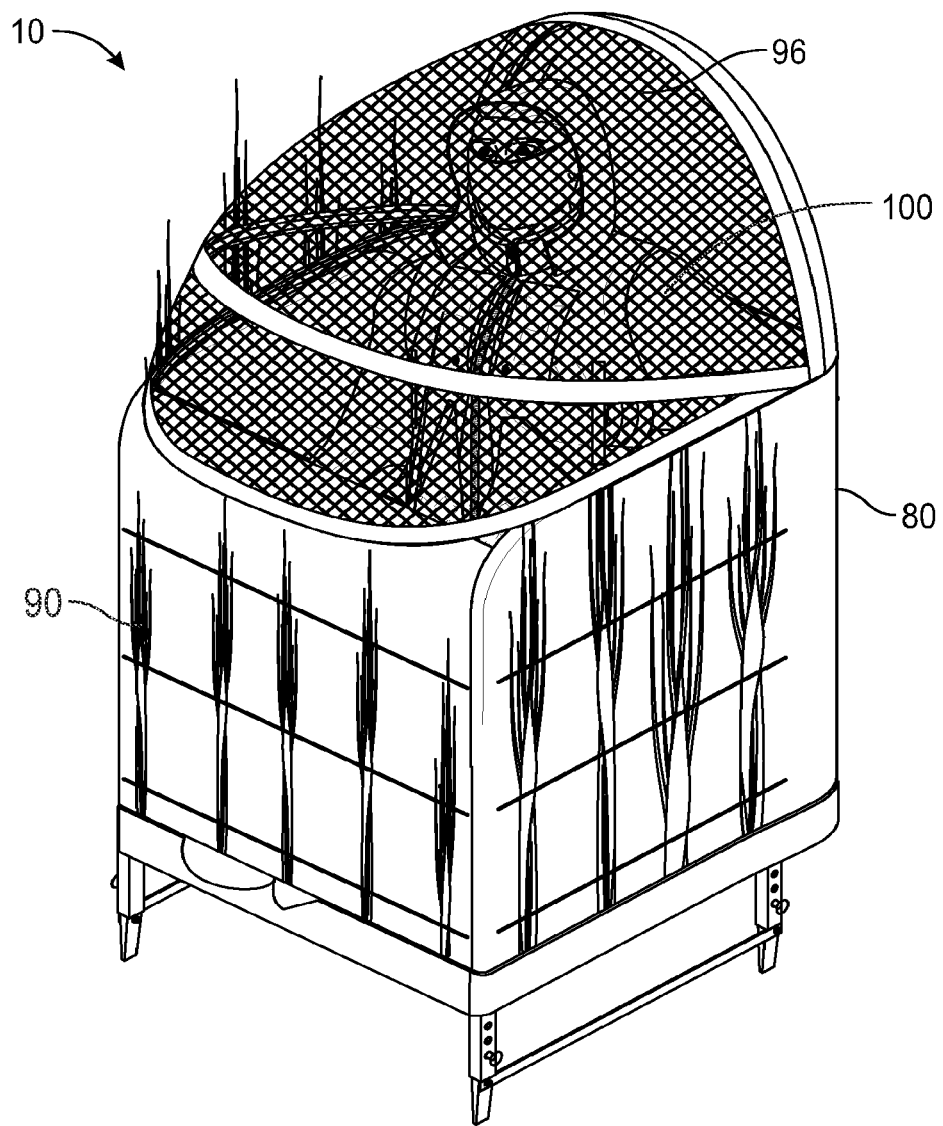
FIG. 12 shows a hunter seated inside the portable hunting blind.

FIG. 12 shows a feature of a user or hunter 100 sitting on seat 50 inside portable hunting blind 10, in accordance with one embodiment of the present invention. As can be seen, bonnets 70 expand and provide ample headroom beneath blind top 96 for hunter 100. When a flying waterfowl looks down, it only sees camouflaged portable hunting blind 10. On the other hand, a hunter 100 on the seat 50 in the portable hunting blind 10 clearly sees the waterfowl above through blind top 96.

As presented above (FIG. 2A), portable hunting blind 10 provides a three-sided structure of a four-sided square, in essence. Two sides i.e., first side panel 22 and second side panel 24 are unfolded, parallel to the other side and perpendicular to the back i.e., connecting rod 64 and support arms 66. Portable hunting blind 10 including two side panels (two sides) 22;24, hinge brackets 52 with the support arms (back) 66 and seat 50 form a chair-like structure.

As specified above, skeletal frame structure 20 includes braces 52 that folds down and has fabric attached to it. Folded down braces 52 include a durable fabric and structure that creates seat 50 and braces 52 for two sides at the same time. One advantage of portable hunting blind 10 is that durability is achieved through weight distribution bracing and support points, which are provided by the way portable hunting blind 10 folds and distributes weight. As such, first side panel 22 and second side panel 24 become part of seat 50 for bracing. The prior art portable hunting blind, like a typical folding chair has legs that have "X" configuration beneath the seat. All of the weight flows through the legs pivot points where the legs scissor or "X" configuration. This causes all of the hunter's weight to be experienced in only two spots on the folding frame. In contrast, the presently disclosed portable hunting blind 10 provides four corner attachment points where the weight is distributed. The presently disclosed portable hunting blind 10 further includes two braces 52 beneath seat 50. These two braces 52 evenly distribute the weight from each corner back to the other side. The result of the presently disclosed portable hunting blind 10 provides a suspension seat wherein the hunter 100 does not feel a frame beneath his body. This essentially allows hunter 100 to bounce on a fabric air seat 50.

After setting up skeletal frame structure 20, hunter 100 adjusts the height of skeletal frame structure 20 using leg height adjustment mechanism 40 provided at first side panel 22 and second side panel 24. The height of skeletal frame structure 20 is adjustable to hunter's sitting position on seat 50 within portable hunting blind 10. For example, when portable hunting blind 10 is in shallow water, the height of first side panel 22 and second side panel 24 are adjustable using leg height adjustment mechanism 40 such that hunter 100 is comfortably seated above the water. Further, hunter 100 mounts skirt 80 around skeletal frame structure 20 and slips brushes 90 behind into bungee cord 82 and in brush pouch 84 to blend portable hunting blind 10 with the environment.

Concurrently or consecutively, hunter 100 mounts bonnets 70 to hinge brackets 60. In one example, hunter 100 mounts bonnets 70 in a lifted position. Further, hunter 100 enters into portable hunting blind 10 through front side 12 of portable hunting blind 10 by uninstalling snaps 86 and magnet 88 at front wall of skirt 80. Subsequently, hunter 100 connects front wall of skirt 80 to skeletal frame structure 20 and closes camouflage bonnets 70 to conceal him (FIG. 12). As specified above, blind top 96 includes channels that allow hunter 100 to see through. As such, once hunter 100 is inside, portable hunting blind 10 comfortably conceals hunter 100 from outside while allowing hunter 100 to see what is going on around him. Bonnets 70 together with blind top 96 appear like a canopy above the hunter's head.

From the above description, a person skilled in the art understands that seat 50 supported with the help of first side panel 22 and second side panel 24 along with back i.e., connecting rod 64 and support arms 66 act as a chair for hunter 100 to sit on while being concealed from outside.

Figure 13:
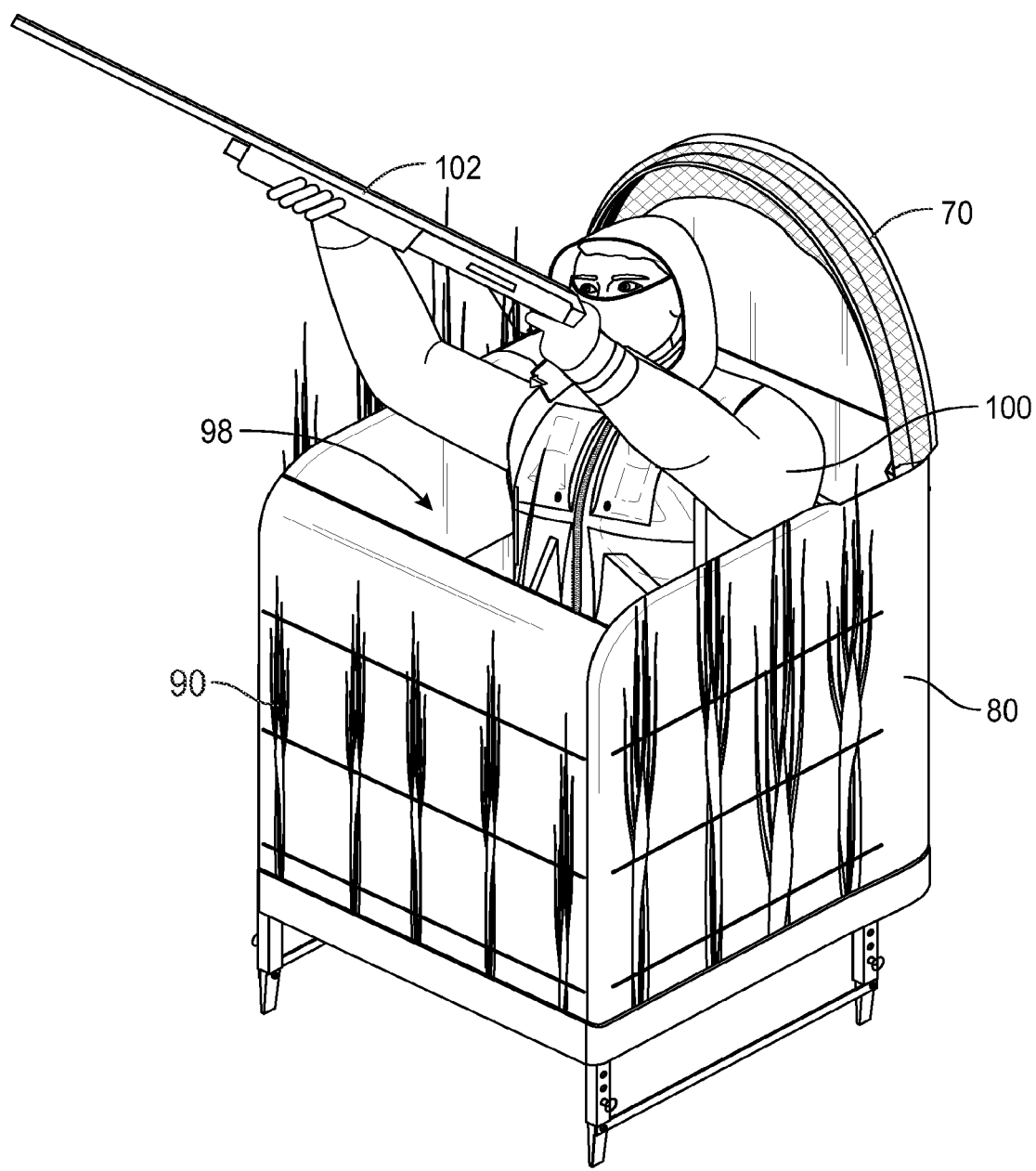
FIGS. 13 and 14 illustrate the hunter shooting down a waterfowl lifting bonnet and exiting portable hunting blind to pick up the fallen waterfowl, in accordance with one embodiment of the present disclosure.
Figure 14:
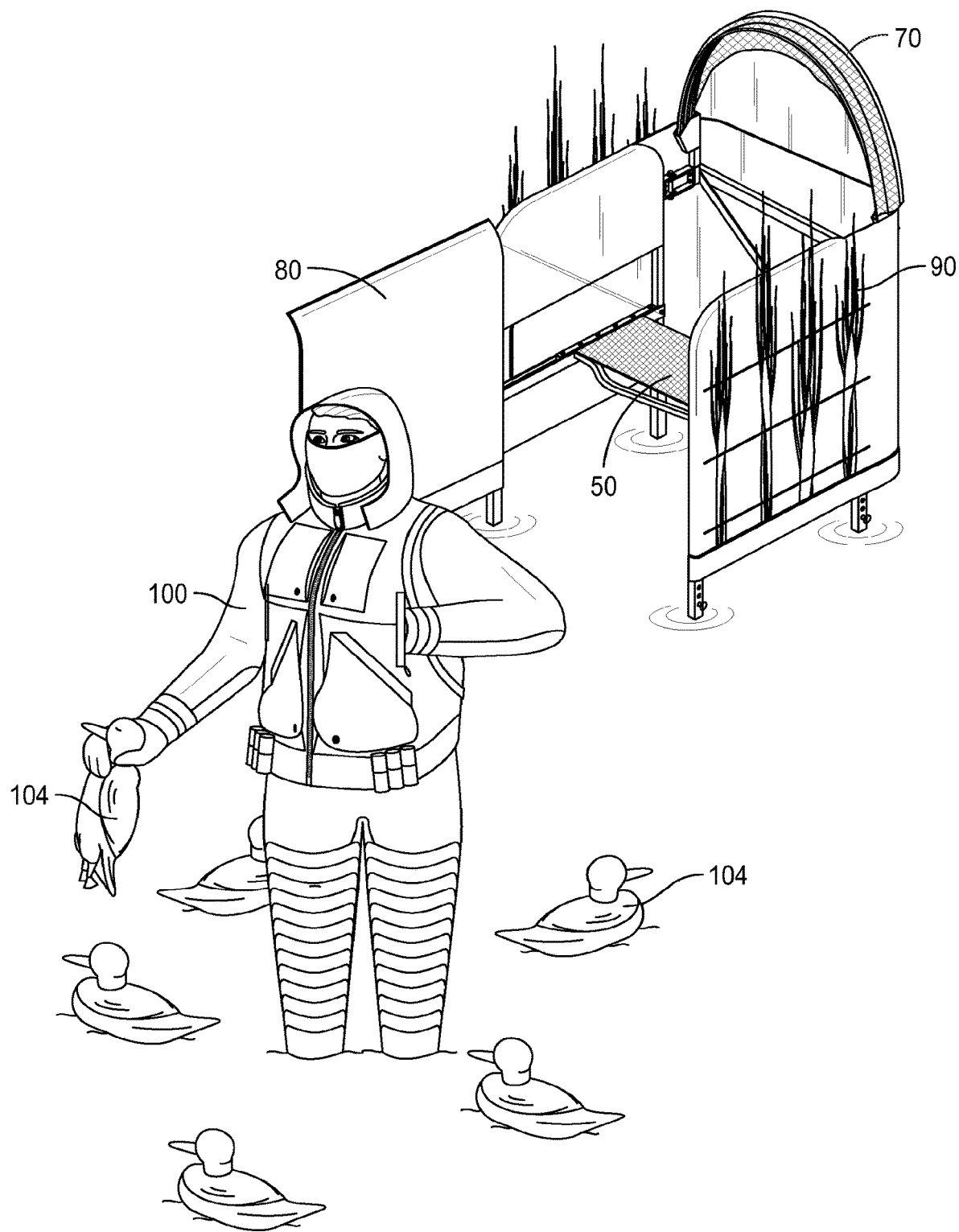

When hunter 100 wishes to use portable hunting blind 10 to hunt or wildlife photography, hunter 100 quickly lifts bonnets 70 and throws back. Subsequently, hunter 100 uses a firearm or air rifle to shoot down a flying waterfowl or uses a camera to capture the flying waterfowl. FIG. 13 shows an exemplary embodiment showing hunter 100 using firearm rifle 102 to shoot down the flying waterfowl upon lifting and throwing back bonnets 70. As hunter 100 stands up to shoot or exit from portable hunting blind 10, his knees hit skirt 80 and push magnet 88 away from its latch to allow skirt 80 (FIGS. 8B and 8C) to easily fall aside without interfering with movement of hunter 100. Subsequently, hunter 100 walks in the water to pick up fallen waterfowls 104 as shown in FIG. 14. However, a person skilled in the art understands that portable hunting blind 10 also allows for hunting birds on land i.e., field hunting without departing from the scope of the present invention.

After finishing hunting, hunter 100 folds and transports portable hunting blind 10 easily. In order to fold portable hunting blind 10, at first, hunter 100 folds skeletal frame structure 20. Due to the construction of hinge brackets 60, connecting rod 64, and support arms 66, first side panel 22 and second side panel 24, they can be operated similar to a walker, in which hinge brackets 60, connecting rod 64, and support arms 66 form back of walker and first side panel 22 and second side panel 24 form two sides of the walker. The two side panels fold towards one another for storing and take up less space than known portable hunting blinds. Portable hunting blind 10 side panels stay uniform or square when folding for transport. In other words, there is no twisting or contorting such as occurs in known portable hunting blind chairs. The sides of the presently disclosed portable hunting blind 10 also act as a part of the seat for bracing. A good blind allows for brushing the perimeter wall of the blind. The wall of presently disclosed 10 is also a part of the seat. When the hunter folds side panels 22, 24, including brush 90 on outer wall/skirt 80, brush 90 stays in place, for transport. As such, there is no need to remove the brushes or remove the wind blocker panels of the present disclosure. The brushes simply stay where they are, secured by bungee cord 82 and ready for immediate use. As a result, the present invention makes this a super-fast set-up and takedown. Once the hunter folds the two sides into the backside, he is ready to transport the portable hunting blind to a new location. This ease of use is markedly different from the prior art hunting blinds for which disassembly to leave the hunting scene takes much longer and is significantly more complicated.

Further, portable hunting blind 10 includes modification wherein hinge brackets 60 on left side panel 24 are longer, or deeper, than hinge brackets 60 on right or opposite side panel 22. By extending the size of left side hinge brackets 60, left and right side panels 22, 24 fold flat. Longer hinge brackets 60 on the opposite side provides sufficient room for folding flat on top of the right or other side that folded in first. The brush and limbs take up room and can prevent the sides from folding flat, as such by providing the needed room with hinge brackets 60, the side and its brush can be folded into the back, first. Then the second side can fold on top of the folded side to provide desired flat folded portable hunting blind 10.

For the presently disclosed portable hunting blind 10, bonnets 70 and blind top 96 are easily removable. In some instances, the hunter 100 removes bonnets 70 and blind top 96 for transport. But again, because blind top 96 is formed out of flat spring steel, bonnets 70 and skeletal frame structure 20 are sufficiently taut to hold its shape, while also flexible enough so that it will easily bend and twist. This enables it to have a top that pivots from both sides of the blind outside the hunter's shoulders and above his head.

With the presently disclosed bonnets 70 and blind top 96, hunter 100 can very easily throw back bonnets 70 for preparing portable hunting blind 10 for transport. The flexible nature of flat spring steel allows blind top 96 to fold perfectly and eliminates the need for its removal. Then two sides i.e., first side panel 22 and second side panel 24 may be folded as explained above, and portable hunting blind 10 becomes ready for easy transport.

In one implementation, a strap (not shown) may be provided on portable hunting blind 10 such that it may be carried by the hunter in folded condition.

Based on the above, it is evident that set-up and takedown of portable hunting blind 10 is fast and convenient. As a result, valuable time can be saved in the dark when the hunter is getting prepared for hunting. Moreover, the set-up and takedown of portable hunting blind 10 saves time when the hunter or user needs to move locations. Further, the ease of use becomes especially appreciated when the hunt is over and the hunter is tired, hungry and ready to get back to camp. As such, portable hunting blind 10 provides simple, reliable, and quick setup and takedown.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort may be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter.

What is claimed:

1. A portable hunting blind, comprising:
   a skeletal frame structure including a first side panel and a second side panel;
   hinge brackets mounted to the first side panel and the second side panel;
   at least one bonnet held by a bonnet attachment mounted to the hinge brackets, wherein the at least one bonnet is configured to extend and retract;

support arms mounted to the hinge brackets in a scissor configuration; and a seat hingedly mounted to the first side panel and the second side panel for allowing a hunter to sit on the seat.

2. The portable hunting blind of claim 1, further including a skirt carried on the first and second side panels and extending around the skeletal frame structure to envelope the skeletal frame structure and conceal the hunter sitting on the seat.

3. The portable hunting blind of claim 2, wherein the skirt comprises a bungee cord, and a brush pouch.

4. The portable hunting blind of claim 1, further including a blind top mounted to the at least one bonnet, wherein the blind top folds when the at least one bonnet is retracted providing access to an interior of the portable hunting blind, and unfolds when the at least one bonnet is extended for blending the portable hunting blind with environment.

5. The portable hunting blind of claim 4, wherein said blind top comprises a flat spring steel for permitting twisting for permitting said blind top to twist and fold for ease in transport and without requiring removal of said blind top.

6. The portable hunting blind of claim 4, wherein the blind top comprises channels for allowing the hunter to see through from inside of the portable hunting blind and concealing the hunter from outside.

7. The portable hunting blind of claim 1, further including a first brace adapted for stabilizing said portable hunting blind chair in mud to minimize sinking, and a second brace adapted for supporting the seat and suspending the hunter side to side, such that the hunter sits in said seat without his rear touching said skeletal frame structure.

8. The portable hunting blind of claim 1, further comprises braces beneath the seat for evenly distributing the weight of the hunter from each corner back to the other side.

9. The portable hunting blind of claim 1, wherein the hinge brackets on the second side panel are longer, or deeper, than the hinge brackets on the first side panel for facilitating folding of the first and second side panels.

10. A portable hunting blind, comprising:
a skeletal frame structure;
hinge brackets mounted to the skeletal frame structure, wherein the hinge brackets on a second side panel are longer, or deeper, than the hinge brackets on a first side panel;
a seat hingedly mounted to the skeletal frame structure and adapted for allowing a hunter to sit on the seat; and
a skirt carried on the skeletal frame structure and extending around the skeletal frame structure to envelope the skeletal frame structure and conceal the hunter sitting on the seat.

11. The portable hunting blind of claim 10, further including at least one bonnet held by a bonnet attachment mounted to the hinge brackets, wherein the at least one bonnet is configured to extend and retract.

12. The portable hunting blind of claim 11, further including a blind top mounted to the at least one bonnet, wherein the blind top folds when the at least one bonnet is retracted providing access to an interior of the portable hunting blind, and unfolds when the at least one bonnet is extended for blending the portable hunting blind with environment.

13. The portable hunting blind of claim 12, wherein said blind top comprises a flat spring steel for permitting twisting for permitting said blind top to twist and fold for ease in transport and without requiring removal of said blind top.

14. The portable hunting blind of claim 13, further including a first brace adapted for stabilizing said portable hunting blind chair in mud to minimize sinking, and a second brace adapted for supporting the seat and suspending the hunter side to side, such that the hunter sits in said seat without his rear touching said skeletal frame structure.

15. The portable hunting blind of claim 12, wherein the blind top comprises channels for allowing the hunter to see through from inside of the portable hunting blind and concealing the hunter from outside.

16. The portable hunting blind of claim 10, further comprises braces beneath the seat for evenly distributing the weight of the hunter from each corner back to the other side.

17. The portable hunting blind of claim 10, wherein the skirt comprises a bungee cord, and a brush pouch.

* * * * *